United States Patent
Suarez

(10) Patent No.: US 10,359,740 B2
(45) Date of Patent: Jul. 23, 2019

(54) SWITCHED-CAPACITOR TUNING OF A PROPORTIONAL-INTEGRAL-DERIVATIVE CONTROLLER

(71) Applicant: The United States of America, as represented by the Secretary of the Army, Washington, DC (US)

(72) Inventor: John Suarez, Brooklyn, NY (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/675,812

(22) Filed: Aug. 14, 2017

(65) Prior Publication Data

US 2019/0052170 A1 Feb. 14, 2019

(51) Int. Cl.
G05B 11/42 (2006.01)
G05B 13/02 (2006.01)
G05F 1/625 (2006.01)
H02M 3/07 (2006.01)
H02M 1/00 (2006.01)

(52) U.S. Cl.
CPC ............ *G05B 13/024* (2013.01); *G05B 11/42* (2013.01); *G05F 1/625* (2013.01); *H02M 3/07* (2013.01); *H02M 2001/0003* (2013.01)

(58) Field of Classification Search
CPC .... G05B 11/42; G05B 13/021; G05B 13/024; G05F 1/625; H02M 2001/0003; H02M 2001/0025; H02M 3/07
See application file for complete search history.

(56) References Cited

U.S. PATENT DOCUMENTS

| | | | | |
|---|---|---|---|---|
| 3,652,942 A | * | 3/1972 | O'Connor | G05B 11/42 327/335 |
| 3,727,036 A | * | 4/1973 | O'Connor | G05B 11/42 318/609 |
| 4,163,279 A | * | 7/1979 | Kubota | G05B 11/42 318/610 |
| 4,577,097 A | * | 3/1986 | Keyes, IV | G05B 11/42 250/214 R |
| 5,245,262 A | * | 9/1993 | Moody | G05B 19/4142 318/560 |
| 5,278,478 A | * | 1/1994 | Moody | G05B 11/42 318/560 |

(Continued)

*Primary Examiner* — Fred E Finch, III
(74) *Attorney, Agent, or Firm* — Ronald Krosky; Azza Jayaprakash

(57) ABSTRACT

Various embodiments are described that relate to a proportional-integral-derivative controller. The proportional-integral-derivative controller obtains an input voltage and from the input voltage produces an output voltage. Achievement of a particular output voltage can be accomplished through variable resistances in the proportional-integral-derivative controller. To realize these variable resistances, a switching capacitor set can be employed. The switching capacitor set can include individual capacitors with switches. The switches can function with a switching frequency. The switching frequency causes individual capacitors to function with an effective resistance. The resistance can directly correspond to the switching frequency. To change the resistance, the switching frequency can be changed.

17 Claims, 10 Drawing Sheets

(56) References Cited

U.S. PATENT DOCUMENTS

| | | | | |
|---|---|---|---|---|
| 5,646,513 A | * | 7/1997 | Riggio, Jr. | H02M 3/156 323/282 |
| 2004/0247080 A1 | * | 12/2004 | Feda | G01N 23/223 378/101 |
| 2007/0040617 A1 | * | 2/2007 | Koukab | H03L 7/099 331/16 |
| 2011/0057645 A1 | * | 3/2011 | Jager | B60T 8/36 324/125 |
| 2015/0192946 A1 | * | 7/2015 | Kwon | G05F 3/08 323/313 |
| 2017/0359077 A1 | * | 12/2017 | Dempsey | H03M 1/08 |
| 2017/0371362 A1 | * | 12/2017 | Fernald | G01R 19/0092 |

\* cited by examiner

SWITCHED-CAPACITOR TUNING OF A PROPORTIONAL-INTEGRAL-DERIVATIVE CONTROLLER

GOVERNMENT INTEREST

The innovation described herein may be manufactured, used, imported, sold, and licensed by or for the Government of the United States of America without the payment of any royalty thereon or therefor.

BACKGROUND

A control system can be employed to regulate an output. The control system can receive in an input from a main system. The control system can produce an output from the input. The output can be fed back into the main system. This output modifies the input that is again received by the control system. With this, the control system can function to constantly correct the main system.

SUMMARY

In one embodiment, a proportional-integral-derivative controller comprises a capacitor comprising a first end and a second end opposite the first end. The proportional-integral-derivative controller also comprises a switch comprising a first end and a second end. The first end of the switch is coupled to the first end of the capacitor. The second end of the switch alternates at a frequency between at least two points such that a resistance is produced. The resistance corresponds to the frequency.

In another embodiment, a system comprises a frequency selection component configured to select a switch frequency associated with a switched capacitor that is part of a proportional-integral-derivative controller. The system also comprises an effectuation component configured to cause the proportional-integral-derivative controller to be effectuated with the switch frequency at the switched capacitor such that a resistance is produced that is dependent on the switch frequency. The frequency selection component, the effectuation component, or a combination thereof is, at least in part, implemented by way of hardware.

In yet another embodiment, a method is performed, at least in part, by an apparatus comprising a proportional-integral-derivative controller with a switched capacitor that produces a variable resistance. The method comprises collecting a current error value set for a system, collecting a past error value set for the system, and collecting a future error value set for the system. The method also comprises producing a correction voltage based, at least in part, on the current error value set, the past error value set, and the future error value set.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1A:
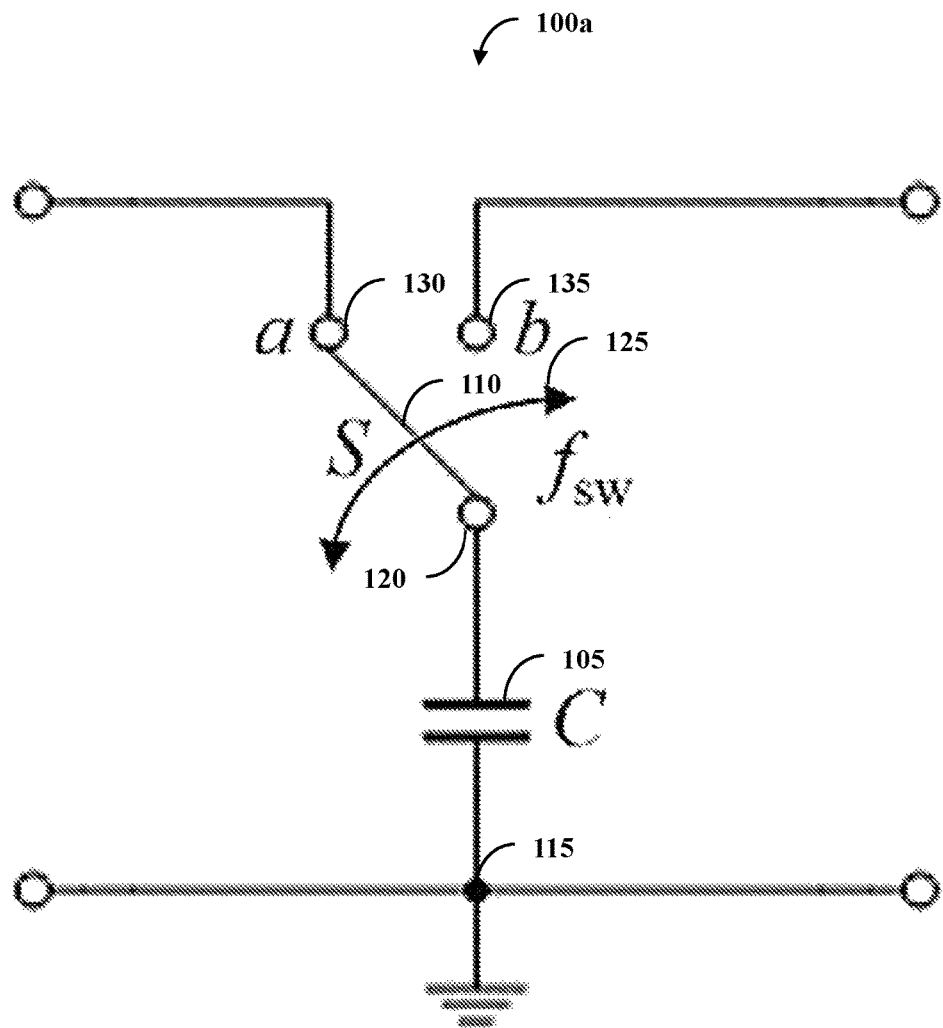
FIG. 1a illustrates one embodiment of a system comprising a capacitor and a switch.

A proportional-integral-derivative controller with a switch capacitor set can be implemented. The switch capacitor set can comprise one or more switch capacitors. The switch capacitors can be used to provide a variable resistance. The variable resistance can be directly related to a frequency of a switch associated with an individual switch capacitor. To change the resistance, the frequency can be changed. Using switch capacitors can be more accurate than using potentiometers as they can be immune to physical changes such as a temperature change and can be more easily modified. Further, using switch capacitors can improve granularity of resistance.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1a illustrates one embodiment of a system 100a comprising a capacitor 105 (at a physical capacitance with a value of 'C') and a switch 110 (of a length '5'). The capacitor 105 can comprise a first end 115 and a second end 120 opposite the first end 115. The switch 110 can also comprise two ends with a first end being coupled to the first end 120 of the capacitor (e.g., function as the same end). The second end of the switch 110 can alternate at a frequency 125 (a switching frequency with a value of '$f_{sw}$') between at least two points 130 and 135 (at coordinates 'a' and 'b'). This alternation can be such that the system 100a produces a resistance that corresponds to the frequency.

Figure 1B:
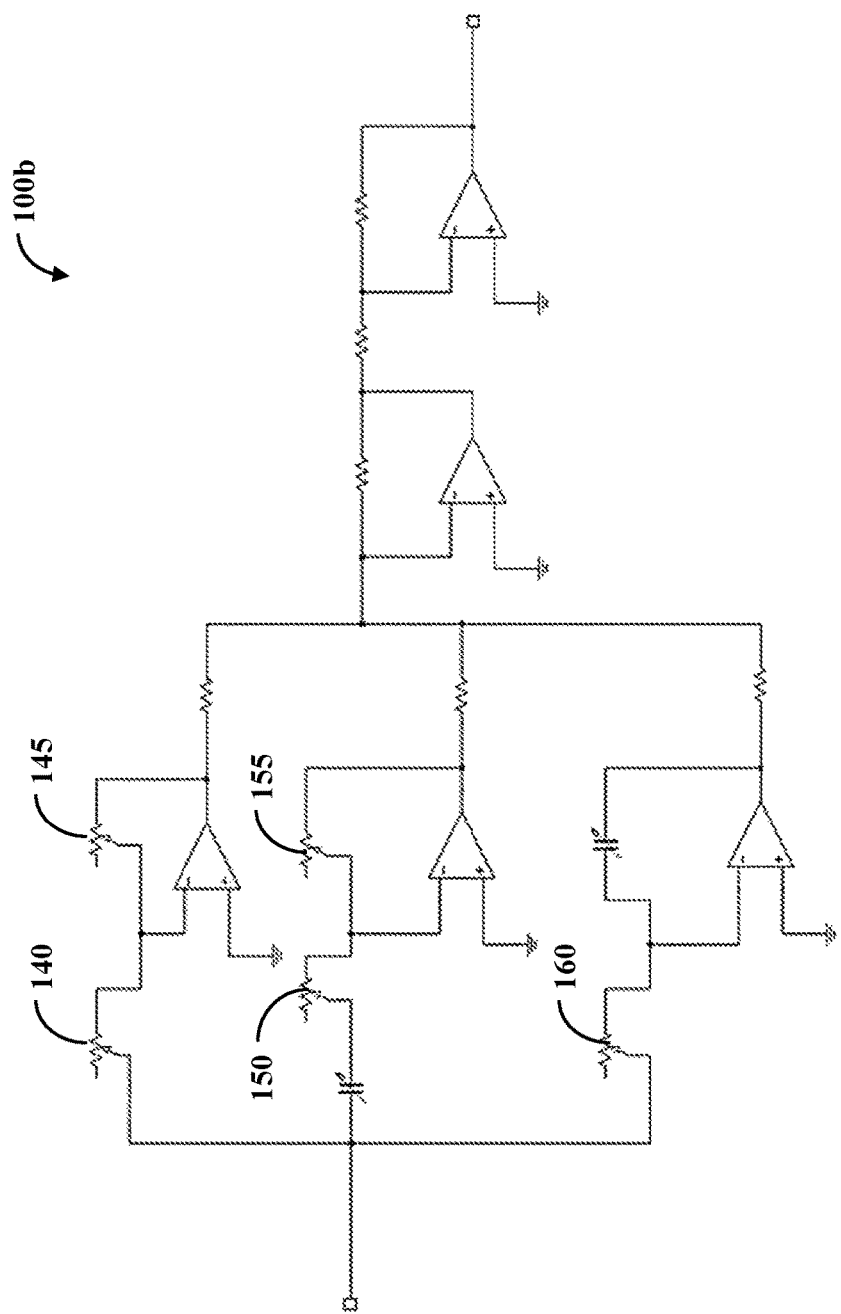
FIG. 1b illustrates one embodiment of an example proportional-integral-derivative controller.

FIG. 1b illustrates one embodiment of an example proportional-integral-derivative controller 100b. This controller 100b is illustrated with five variable resistors 140-160, but again this is an example and a controller can be used with more or less variable resistors. The variable nature of the resistors can be achieved in multiple manners.

In one embodiment, the variable resistors 140-160 can be implemented with potentiometers (e.g., one potentiometer for the variable resistor 140). While one can use potentiometers, potentiometers do have drawbacks. One such drawback is that over time, potentiometers can drift and therefore a desired resistance is not achieved. Additionally, the potentiometer can be configured to be adjusted manually, which makes quick responsiveness difficult. Further, potentiometers can function with step resistance increments. If a value is desired between steps, a then a closest value would be selected leading to imprecise results.

In another embodiment, the variable resistors 140-160 can be implemented with the system 100a. This can enable simple, accurate, flexible, and repeatable tuning of coefficients of the controller 100b. The resistance 'R' can be calculated with the equation:

$$R=1/(f_{sw}*C) \quad (1)$$

The resistance 'R' can be the effective resistance observed between points 130 and 135. If the physical capacitance 'C' is fixed, then the resistance can be altered by a change in the frequency 125 '$f_{sw}$'. Changing the frequency changes the resistance when the physical capacitance remains constant and in turn changes a coefficient of the controller 100b.

Figure 1C:
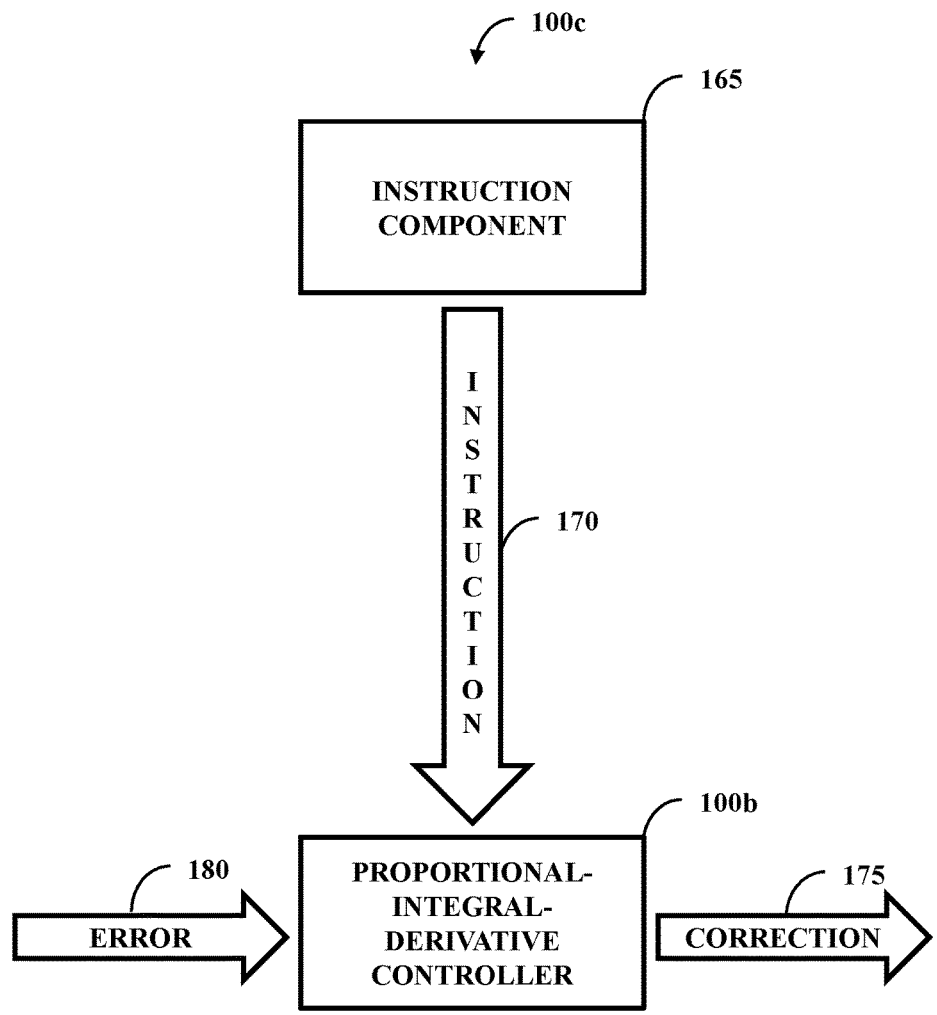
FIG. 1c illustrates one embodiment of a system comprising the controller and an instruction component.

FIG. 1c illustrates one embodiment of a system 100c comprising the controller 100b and an instruction component 165. The instruction component 165 can select the frequency 125 for the switch 110. The frequency 125 can be communicated to the controller 100b as an instruction 170. The instruction 170 can cause the controller 100b to produce a correction 175 for an error 180. While illustrated distinctly, the controller 100b can be considered a controller alone and/or a controller with at least one component disclosed herein (e.g., the system 100c is considered a proportional-integral-derivative controller).

Figure 1D:
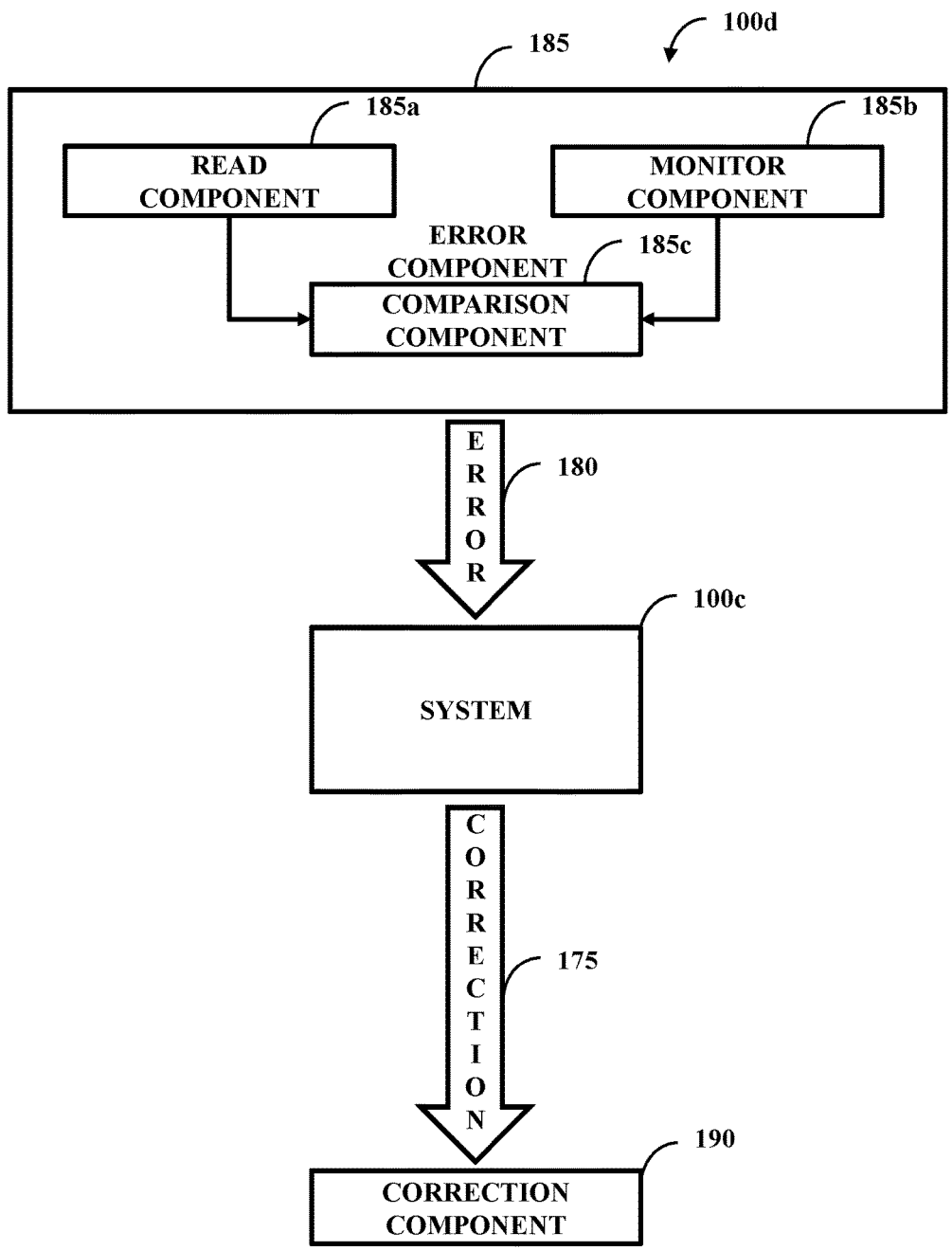
FIG. 1d illustrates one embodiment of a system comprising an error component, the system, and a correction component.

FIG. 1d illustrates one embodiment of a system 100d comprising an error component 185, the system 100c, and a correction component 190. The controller 100b can be operatively coupled to an apparatus. As an example, the apparatus can be a cruise control system of a vehicle, such as an automobile, and the system 100d can be a manager of the cruise control system (note this example with be used throughout the detailed description). A driver of the automobile can set the cruise control at a speed of 55 miles per hour.

A read component 185a can read the set speed of the vehicle and convert the set speed to a set voltage. As an example, the set speed of 55 miles per hour can be converted to 0.55 Volts (V). However, due to various factors, such as elevation traveled by the vehicle and wind speed, the actual speed of the automobile can be different. A monitor component 185b can sense an actual speed of the vehicle and convert the set speed to a monitor voltage. As an example, the actual speed can be 53 miles per hour and can be converted to 0.53 V. The monitor component 185b can employ a transducer to take the physical characteristic of speed and convert the speed into a voltage.

A comparison component 185c can compare the set voltage against the monitor voltage. As an example, the comparison component 185c can subtract the monitor voltage from the set voltage to produce a difference voltage of 0.02 V. The comparison component 185c can implement as a subtraction circuit that functions as an error amplifier. The read component 185a, monitor component 185b, and the comparison component 185c can collectively function as an example error component 185. The error component 185 can output the difference voltage of 0.02 V as the error 180.

The proportional-integral-derivative controller 100b can produce an output voltage that functions as a correction 175. A correction component 190 can implement the correction 175 (e.g., convert error 180 that is a voltage into an action, such as increasing the speed of the automobile). If the error component 185 simply provided the error 180 to the correction component 190, the correction component 190 could make harsh adjustments. The controller 100b can cause adjustments to be smoother. Moreover, the controller 100b can produce the correction 175 in view of anticipated results.

In one example, monitor component 185b can monitor the actual speed at a first point in time and a second point in time, with the first point in time being before the second point in time. At the first point in time, the actual speed can be 54 miles per hour and at the second point in time, the actual speed can be 53 miles per hour. This indicates that the automobile is decelerating. Therefore, when the correction component 190 implements the correction 175, the speed will be lower than 53 miles per hour due to time of operation for the system 100d in view of the automobile decelerating. The controller 100b can compensate for this lower value. Further, the controller 100b can ensure that the output is stable (e.g., non-oscillating).

In one embodiment, the error 180, the set voltage, and the actual voltage can be provided to the instruction component 165. Based on this, the instruction 170 can instruct the controller 100b to implement with a first frequency. The controller 100b can identify this instruction that can cause the switch 110 to alternate at a first frequency at the first point in time. Due to deceleration, the speed can initially be 53 miles per hour, but as the system 100d functions the speed can decrease to 52.8 miles per hour. The correction 175 can be to increase speed; however, the increase would be to 54.8 miles per hour, 0.2 miles per hour below the set speed of 55 miles per hour. Therefore, at the second point in time, the instruction component 165 can instruct for a second frequency, different from the first frequency, to be used.

Considerations of rate of change can be used initially as well. The instruction component 165 can predict, from a pattern of values over time, a rate of deceleration of the automobile and determine how long it takes for the controller 100b to operate. Therefore, the instruction component 165 can set the frequency to compensate for 2.2 miles per hour (0.022 V) and not 2 miles per hour (0.02 V)

While a single frequency is discussed, different frequencies can be used simultaneously for different switches 110. In one example, the variable resistor 140 and the variable resistor 145 can individually have capacitors 105 and switches 110 as illustrated in the system 100a. The switch 110 of the variable resistor 140 can have a first frequency and the switch 110 of the variable resistor 145 can have a second frequency. As the controller 100b is developed in a more complex nature, selecting frequencies can be challenging for different switches to achieve a result. In one embodiment, the selection component selects the first frequency and the second frequency (e.g., different from the first frequency or the same as the first frequency) through use of Ziegler-Nichols tuning rules. This can cause the controller 100b to produce, as the correction 175, an output voltage is non-oscillating and is a correction voltage for the error 180 (e.g., error for operation of the automobile).

When the frequencies for the switches 110 of the variable resistors 140-160 are set, it is possible for the frequencies to experience switch drift (or otherwise to be considered as frequency drift). The monitor component 185b can monitor operation of the controller 100b. At the first point in time, the switch 110 alternates at the first frequency. At the second point in time after the first point in time, the switch 110 can experience the drift such that the switch 110 functions at the second frequency. The read component 185a can read the first frequency and the comparison component 185c can compare the first frequency against the second frequency to produce a result. When this result is not zero, the instruction component 165 can instruct the switch 110 to return to the first frequency at a third point in time after the second point in time.

In one embodiment, the correction 175 and/or a correction from the correction component 190 can be stabilized (e.g., non-oscillating). This can be achieved post controller operation or the controller 100b can be configured to have the frequencies of the switches be such that a non-oscillating correction is produced. Therefore, the correction component 190 or the instruction component 165, as examples, can function as a stabilization component configured to cause an output of the proportional-integral-derivative controller 100b to be stabilized. This can be achieved in various manners, including by way of a frequency-to-voltage comparator, a phase-locked loop (e.g., through use of a reference signal), and/or digital direct synthesis (e.g., produce a digital waveform through digital signal processing and/or through a numerical controlled oscillator).

In one example, the phase-lock loop can function with a voltage control oscillator. The phase-lock loop can be a single integrated circuit comprising an oscillator, a filter, a coupler, and reference oscillator or can have these as discrete hardware components. The phase-lock loop can be an analog circuit or a digital circuit.

Consider the following comparison on the use of the stabilization component. When a person drives the automobile without cruise control, s/he can accelerate by way of an acceleration pedal from 0 mile per hour to 55 miles per hour. After this, the person can remove their foot off an acceleration pedal and the car can slow to 53 miles per hour. The person can then reapply pressure to the acceleration pedal to 55 miles per hour.

To have a smooth and enjoyable ride, the user will typically apply gentle and gradual pressure to the pedal. Additionally, this provides a fine level of control. If the user simply placed maximum pressure on the pedal, then the automobile would be likely to accelerate beyond 55 mile per hour to 57 miles per hour.

With a cruise control system, an accelerator component that manages acceleration may be configured to simply increase speed without consideration as to smoothness. As with the user, this can lead to not only a non-smooth ride, but also lead to overshoot, such as to 57 miles per hour. Once at 57 miles per hour, a decelerator component that manages deceleration can slow the car. Again, a non-smooth response can return to 53 miles per hour. This is a non-stable output as the output would oscillate between 53 and 57 miles per hour without ever reaching the desired 55 mile per hour. The controller 100b can cause the acceleration or deceleration to be smooth and stable such that 55 miles per hour is reached and the ride is more comfortable. So instead of the correction 175 simply being 0.02 V, the correction can be four time-staggered corrections of 0.005 V.

One will appreciate the automobile example is used for conceptual explanation purposes. Aspects disclosed herein can be practiced in fields outside automotive fields or cruise control. Further, actual implementation can be far more complex. For example, since the controller 100b is constantly functioning, outputs are time varying and delayed, and the automobile is being subject to many different factors, implementation and real-world examples can be far more complex. Further, as the error 180 is being corrected, the error 180 can be increasing or decreasing the controller 100b and other components can compensate for these changes.

Figure 2:
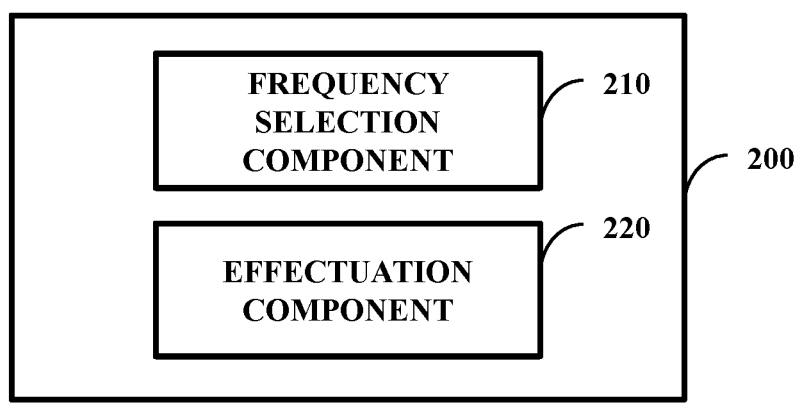
FIG. 2 illustrates one embodiment of a system comprising a frequency selection component and an effectuation component.

FIG. 2 illustrates one embodiment of a system 200 comprising a frequency selection component 210 and an effectuation component 220. The frequency selection component 210 can be configured to select a switch frequency associated with a switched capacitor (e.g., the system 100a of FIG. 1a) that is part of the proportional-integral-derivative controller 100b of FIG. 1b. In one embodiment, the frequency selection component 210 can employ Ziegler-Nichols tuning rules in selection of the switch frequency such an output (e.g., the correction 175 of FIGS. 1c and 1d) of the proportional-integral-derivative controller 100b of FIGS. 1b and 1c is stabilized. Therefore, the frequency selection component 210 can function as the stabilization component. This stabilized output can be a correction voltage for an error of an apparatus operatively coupled to the proportional-integral-derivative controller 100b of FIG. 1.

The effectuation component 220 can be configured to cause the proportional-integral-derivative controller 100b of FIGS. 1b and 1c to be effectuated with the switch frequency at the switched capacitor such that a resistance is produced that is dependent on the switch frequency. After effectuation, the monitor component 185b of FIG. 1d can be configured to monitor the switching frequency after the effectuation to produce a monitor result. The comparison component 185c of FIG. 1d can be configured to compare the monitor result against a threshold to produce a comparison result. An alteration component (e.g., the instruction component 165 of FIG. 1c and/or the effectuation component 220) can be configured to cause an alteration to the switching frequency when the comparison result indicates the alteration should be made. In one example, the monitor component 185*b* of FIG. 1*d* is configured to monitor the switching frequency when the switching frequency changes from a value at effectuation. In response to this, the alteration component can alter the switching frequency to the value at effectuation.

Figure 3:
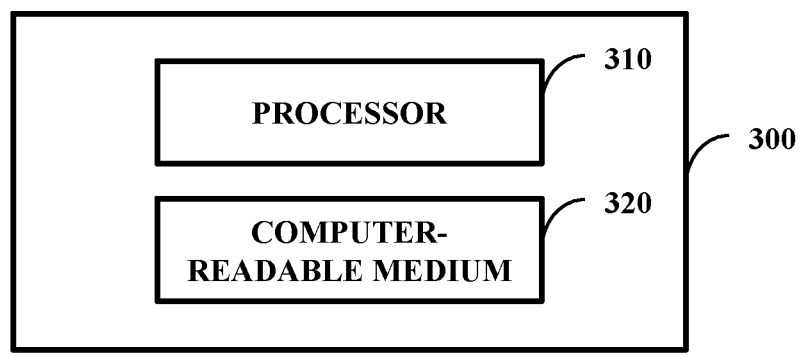
FIG. 3 illustrates one embodiment of a system comprising a processor and a computer-readable medium.

FIG. 3 illustrates one embodiment of a system 300 comprising a processor 310 (e.g., a general purpose processor or a processor specifically designed for performing a functionality disclosed herein) and a computer-readable medium 320 (e.g., non-transitory computer-readable medium). In one embodiment, the computer-readable medium 320 is communicatively coupled to the processor 310 and stores a command set executable by the processor 310 to facilitate operation of at least one component disclosed herein (e.g., the error component 185 of FIG. 1*d*). In one embodiment, at least one component disclosed herein can be implemented, at least in part, by way of non-software, such as implemented as hardware by way of the system 300 (e.g., the frequency selection component 210 of FIG. 2 and/or the effectuation component 220 of FIG. 2). In one embodiment, the computer-readable medium 320 is configured to store processor-executable instructions that when executed by the processor 310, cause the processor 310 to perform a method, that can be an example algorithm, disclosed herein (e.g., the methods 400-700 addressed below).

In one embodiment, an apparatus can comprise the controller 100*b* of FIG. 1*b* and the system 300. This apparatus can perform a method disclosed herein (e.g. the methods 400-700 addressed below). In one example, the apparatus is part of the automobile discussed above.

Figure 4:
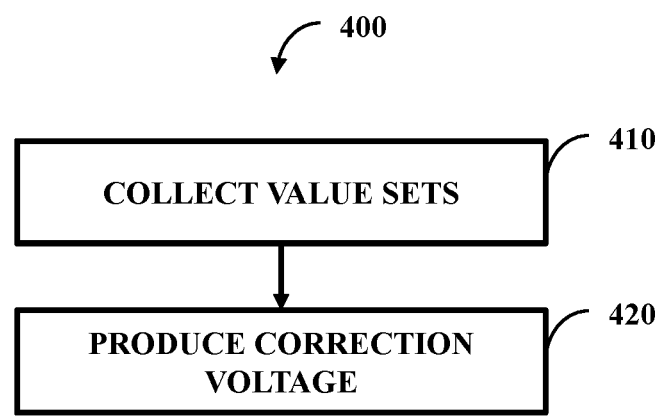
FIG. 4 illustrates one embodiment of a method comprising two actions.

FIG. 4 illustrates one embodiment of a method 400 comprising two actions 410-420. At 410, a past error value set, a current error value set, and a future error value set for a system (e.g., the automobile) can be collected. At 420, there can be producing a correction voltage based, at least in part, on the current error value set, the past error value set, and the future error value set.

Figure 5:
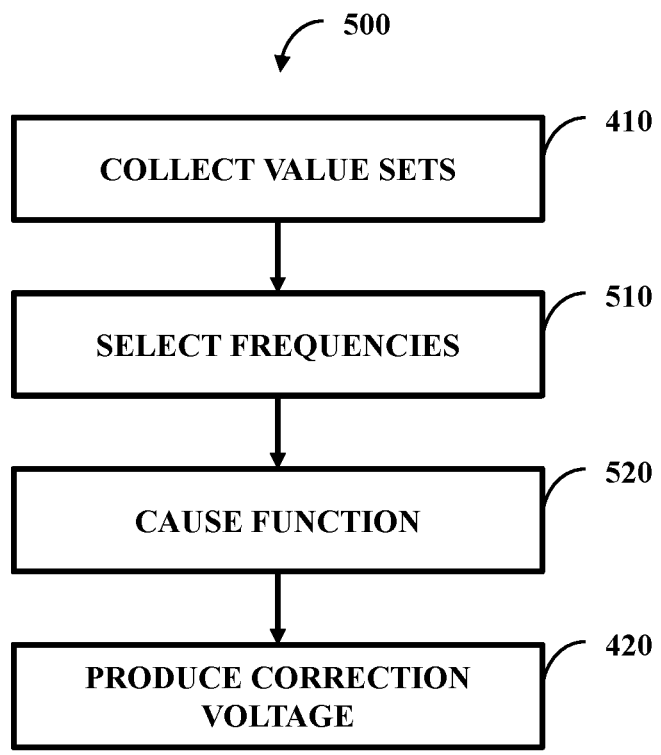
FIG. 5 illustrates one embodiment of a method comprising four actions.

FIG. 5 illustrates one embodiment of a method 500 comprising four actions 410-420 and 510-520. At 410, the value sets can be collected. At 510, selecting a first switching frequency for the first switched capacitor and a second switching frequency for the first switched capacitor can occur. At 520, causing the first switched capacitor to function at the first switching frequency and causing the second switched capacitor to function at the second switching frequency can take place. The first switching frequency and the second switching frequency can be the same frequency or different frequencies. In one embodiment, the first switched capacitor functions at the first switching frequency concurrently with the second switched capacitor functioning at the second switching frequency. At 420, the correction voltage can be produced. The first switching frequency and the second switching frequency can be selected such that the correction voltage is produced as a stable correction voltage. The Ziegler-Nichols tuning rules can be employed in the selecting of the first switching frequency for the first switched capacitor and the selecting the second of switching frequency for the first switched capacitor.

Figure 6:
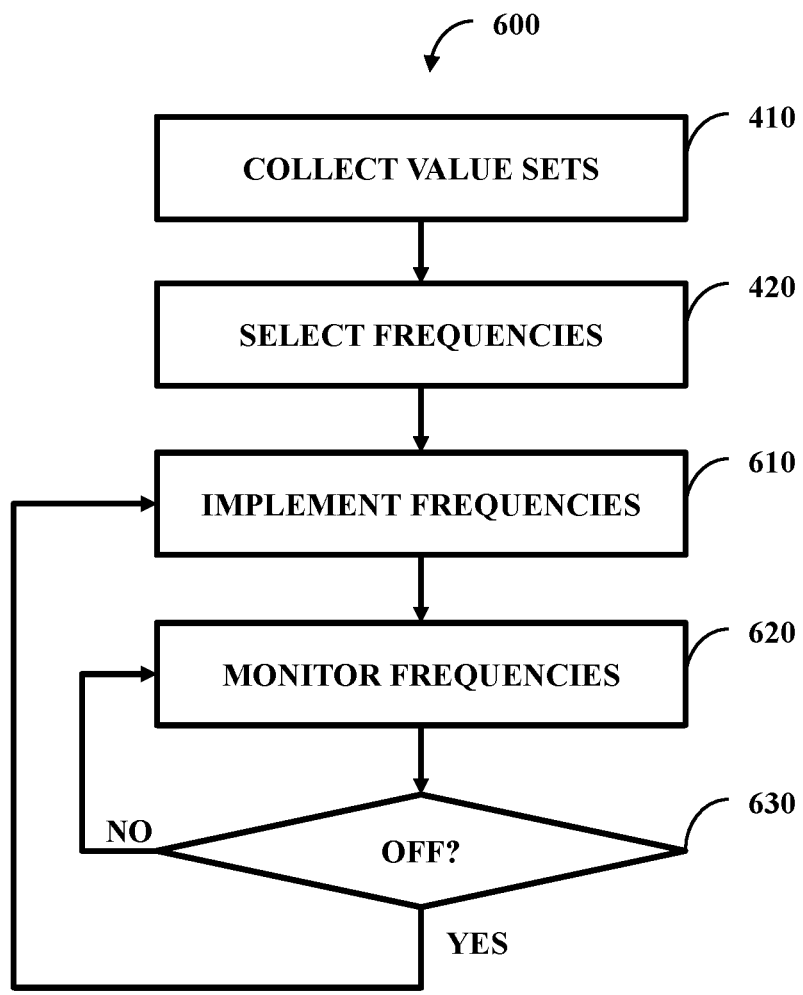
FIG. 6 illustrates one embodiment of a method comprising five actions.

FIG. 6 illustrates one embodiment of a method 600 comprising five actions 410-420 and 610-630. At 410, values can be collected and at 420, frequencies (or a single frequency in a one switched capacitor controller) can be selected. At 610, the frequencies can be implemented such that the switches osculate at their individually assigned frequencies. At 620, monitoring of a switching frequencies of the switched capacitors can occur. At 630, comparing the switching frequencies to their intended frequencies (e.g., the frequencies they were implemented with at 610) can take place. If there is no difference, then the method can return to 620 to continue monitoring. If there is a difference, then the method can return to 610 to correct the switching frequency.

The method 600 can be considered a method for maintaining the switched capacitor with the switching frequency. In one embodiment, maintaining the switched capacitor with the switching frequency is achieved by way of a frequency-to-voltage comparator. In another embodiment, maintaining the switched capacitor with the switching frequency is achieved by way of a phased-locked loop.

Figure 7:
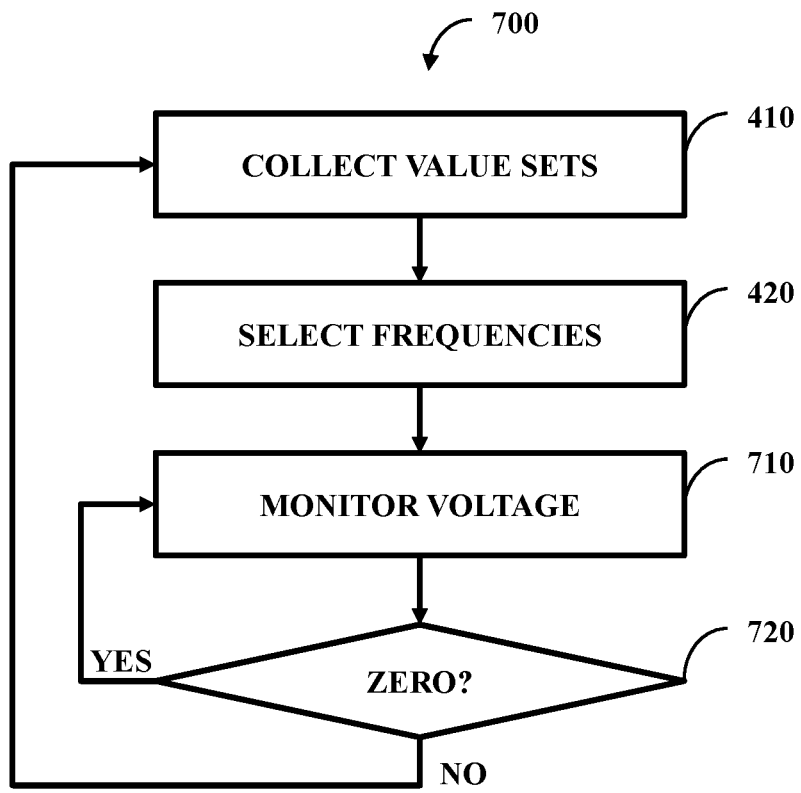
FIG. 7 illustrates one embodiment of a method comprising four actions.

FIG. 7 illustrates one embodiment of a method 700 comprising four actions 410-420 and 710-720. At 410, values can be collected and at 420, frequencies can be selected and implemented. This implementation should correct an error voltage. The error voltage can continue to be monitored at 710. A check 720 can take place determining if the error voltage is zero (e.g., in the automotive example, the actual speed equals the set speed of 55 miles per hour). If the error voltage is zero, then the method 700 can continue monitoring at 710. If the error voltage is not zero, then the method 700 can begin again and the error voltage can be corrected.

The method 400-700 of FIGS. 4-7 can be practiced in accordance with the system 100*a* of FIG. 1*a* and the controller 100*b* of FIG. 1*b*. In one embodiment, the switch 110 of FIG. 1*a* is a transistor that functions at the frequency. The transistor can be embodied on a chip with a pin. The pin can be connected to the capacitor 105 of FIG. 1*a*. The capacitor 105 of FIG. 1*a* can be physically changed based on different desires. With this, changing the capacitor 105 of FIG. 1*a* can change the tuning range of the capacitor 105 of FIG. 1*a*.

In one embodiment, the transistor can have multiple options on pins with which to connect multiple pins. The individual pins can be associated with capacitors of different values. The transistor can connect with different pins based on desired resistances while keeping the same frequency.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A proportional-integral-derivative, comprising:
    a first capacitor comprising a first capacitor first end and a first capacitor second end opposite the first capacitor first end;
    a first switch comprising a first switch first end and a first switch second end,
    a second capacitor comprising a first end and a second end opposite the first end; and
    a second switch comprising a first end and a second end,
    where the first switch first end is coupled to the first capacitor first end,
    where the first switch second end alternates at a first frequency between at least two points such that a first resistance is produced,
    where the second switch first end is coupled to the second capacitor first end,
    where the second switch second end alternates at a second frequency between at least two points such that a second resistance is produced,
    where the first resistance corresponds to the first frequency, where the second resistance corresponds to the second frequency, where the first resistance and the second resistance are different, and where the first frequency and the second frequency are different where upon identification of the first frequency the first switch alternates at the first frequency at a first point in time, where, at a second point in time after the first point in time, the first switch drifts such that the first switch alternates at a drift frequency different from the first frequency, and where, at a third point in time after the second point in time, a correction is made to the first switch such that the first switch returns to the first frequency, where the proportional-integral-derivative controller produces an output voltage, where the first frequency and the second frequency are selected through use of Ziegler-Nichols tuning rules such that the output voltage is non-oscillating, and where the output voltage is a correction voltage for an error of an apparatus operatively coupled to the proportional-integral-derivative controller.

2. The proportional-integral-derivative controller of claim 1, where the first frequency and the second frequency are selected such that the output voltage is a correction voltage for the error and a rate of change of the error.

3. The proportional-integral-derivative controller of claim 1, where the drift frequency is a first drift frequency, where upon identification of the second frequency the second switch alternates at the second frequency at a fourth point in time, where, at a fifth point in time after the fourth point in time, the second switch drifts such that the second switch alternates at a second drift frequency different from the second frequency, and where, at a sixth point in time after the fifth point in time, a correction is made to the second switch such that the second switch returns to the second frequency.

4. The proportional-integral-derivative controller of claim 3, where the first point in time and the fourth point in time are the same point in time and where the third point in time and the sixth point in time are the same point in time.

5. The proportional-integral-derivative controller of claim 4, where the first frequency and the second frequency are selected such that the output voltage is a correction voltage for the error and a rate of change of the error.

6. The proportional-integral-derivative controller of claim 3, where the first frequency and the second frequency are selected such that the output voltage is a correction voltage for the error and a rate of change of the error.

7. A non-transitory computer-readable medium communicatively coupled to a processor and configured to store a command set executable by the processor to facilitate operation of a component set, the component set comprising:

a frequency selection component configured to, through employment of Ziegler-Nichols tuning rules, select a switch frequency associated with a switched capacitor that is part of a proportional-integral-derivative controller; and an effectuation component configured to cause the proportional-integral-derivative controller to be effectuated with the switch frequency at the switched capacitor such that a resistance is produced that is dependent on the switch frequency.

8. The non-transitory computer-readable medium of claim 7, the component set comprising:

a monitor component configured to monitor the switch frequency after the effectuation to produce a monitor result;

a comparison component configured to compare the monitor result against a threshold to produce a comparison result; and an alteration component configured to cause an alteration to the switch frequency when the comparison result indicates the alteration should be made.

9. The non-transitory computer-readable medium of claim 8, where the monitor component is configured to monitor the switch frequency when the switch frequency changes from a value at effectuation and where the alteration returns the switch frequency to the value at effectuation.

10. The non-transitory computer-readable medium of claim 7, the component set comprising:

a stabilization component configured to cause an output of the proportional-integral-derivative controller to be stabilized.

11. The non-transitory computer-readable medium of claim 10, where the output is a correction voltage for an error of an apparatus operatively coupled to the proportional-integral-derivative controller.

12. The non-transitory computer-readable medium of claim 10, where the stabilization component employs digital direct synthesis to cause the stabilization.

13. The non-transitory computer-readable medium of claim 7, comprising:

an error component configured to identify a specific output voltage for production by the proportional-integral-derivative controller, where the frequency selection component selects the switch frequency so that the proportional-integral-derivative controller produces a specific output voltage.

14. The non-transitory computer-readable medium of claim 13, where the specific output voltage produced by the proportional-integral-derivative controller is unstable and where the specific output voltage is stabilized post-proportional-integral-derivative controller.

15. A method, comprising:

collecting a current error value set for a system;

collecting a past error value set for the system;

collecting a future error value set for the system;

selecting, by way of a frequency selection component, a switching frequency for a switch of a switched capacitor to produce a correction voltage based, at least in part, on the current error value set the past error value set, and the future error value set; and causing the switched capacitor to implement with the switching frequency, where the switching frequency is selected such that the correction voltage is produced as a stable correction voltage, where the switched capacitor produces a variable resistance based, at least in part, on the switching frequency for the switch, where a proportional-integral-derivative controller performs the collecting the current error value set for the system, the collecting the past error value set for the system, and collecting the future error value set for the system, and where the switched capacitor is not part of the proportional-integral-derivative controller.

16. The method of claim 15, identifying, after causing the switch to implement with the switching frequency, the switch drifting to a drift frequency different from the switching frequency; and causing, after identifying the switch drifting, the switch to return to the switching frequency.

17. The method of claim 15, where selecting the switching frequency occurs through employment of Ziegler-Nichols tuning rules.

\* \* \* \* \*